(12) United States Patent
Savchuk

(10) Patent No.: US 7,698,996 B1
(45) Date of Patent: Apr. 20, 2010

(54) SMOKING APPARATUS

(76) Inventor: Alexander S. Savchuk, 500 Hoodridge Dr., Pittsburgh, PA (US) 15234

( * ) Notice: Subject to any disclaimer, the term of this patent is extended or adjusted under 35 U.S.C. 154(b) by 840 days.

(21) Appl. No.: 11/412,529

(22) Filed: Apr. 28, 2006

(51) Int. Cl.
*A23L 1/00* (2006.01)

(52) U.S. Cl. .......................................... 99/482; 99/470

(58) Field of Classification Search ........... 99/325–333, 99/339, 340, 348, 444–450, 467–482; 126/25 R, 126/9 R, 20, 21 A; 219/385–401, 411
See application file for complete search history.

(56) References Cited

U.S. PATENT DOCUMENTS

| | | | | |
|---|---|---|---|---|
| 3,817,166 A | * | 6/1974 | McLain | 99/480 |
| 3,903,788 A | * | 9/1975 | Freeland et al. | 99/475 |
| 3,974,760 A | * | 8/1976 | Ellis | 99/482 |
| 4,201,125 A | * | 5/1980 | Ellis | 99/446 |
| 4,232,597 A | * | 11/1980 | Perrine et al. | 99/468 |
| 4,474,107 A | * | 10/1984 | Cothran | 99/352 |
| 4,669,447 A | * | 6/1987 | Kelly | 126/59.5 |
| 4,924,071 A | * | 5/1990 | Jacobs | 219/400 |
| 6,644,178 B2 | * | 11/2003 | Clark | 99/482 |
| 6,841,759 B2 | * | 1/2005 | Elwedini | 219/386 |
| 6,868,777 B1 | * | 3/2005 | Higgins et al. | 99/482 |
| 7,157,668 B2 | * | 1/2007 | Bartelick | 219/393 |

\* cited by examiner

Primary Examiner—Timothy F. Simone

(57) ABSTRACT

A smoking apparatus is disclosed. An illustrative embodiment of the smoking apparatus includes a base having a base interior, at least one heating element provided in the base interior, a trough carried by the at least one heating element and a lid provided on the base.

16 Claims, 7 Drawing Sheets

SMOKING APPARATUS

FIELD

The present invention relates to food smoking apparatuses. More particularly, the present invention relates to a smoking apparatus which is suitable for smoking a variety of foods.

BACKGROUND

Smoking is a common technique which is used to impart a smoked flavor to meats and vegetables. Typically, a conventional smoking apparatus includes a container having a container interior adapted to contain the food or foods to be smoked. A lid is provided on the container to hold smoke in the container during the smoking process. Wood chips or the like are provided in the bottom of the smoker and burned to emit smoke. The smoke covers and flavors the food in the container interior. Conventional food smoking apparatuses are typically designed for exterior use.

SUMMARY

The present invention is generally directed to a smoking apparatus. An illustrative embodiment of the smoking apparatus includes a base having a base interior, at least one heating element provided in the base interior, a trough carried by the at least one heating element and a lid provided on the base.

BRIEF DESCRIPTION OF THE DRAWINGS

The invention will now be described, by way of example, with reference to the accompanying drawings, in which.

DETAILED DESCRIPTION

Figure 4:
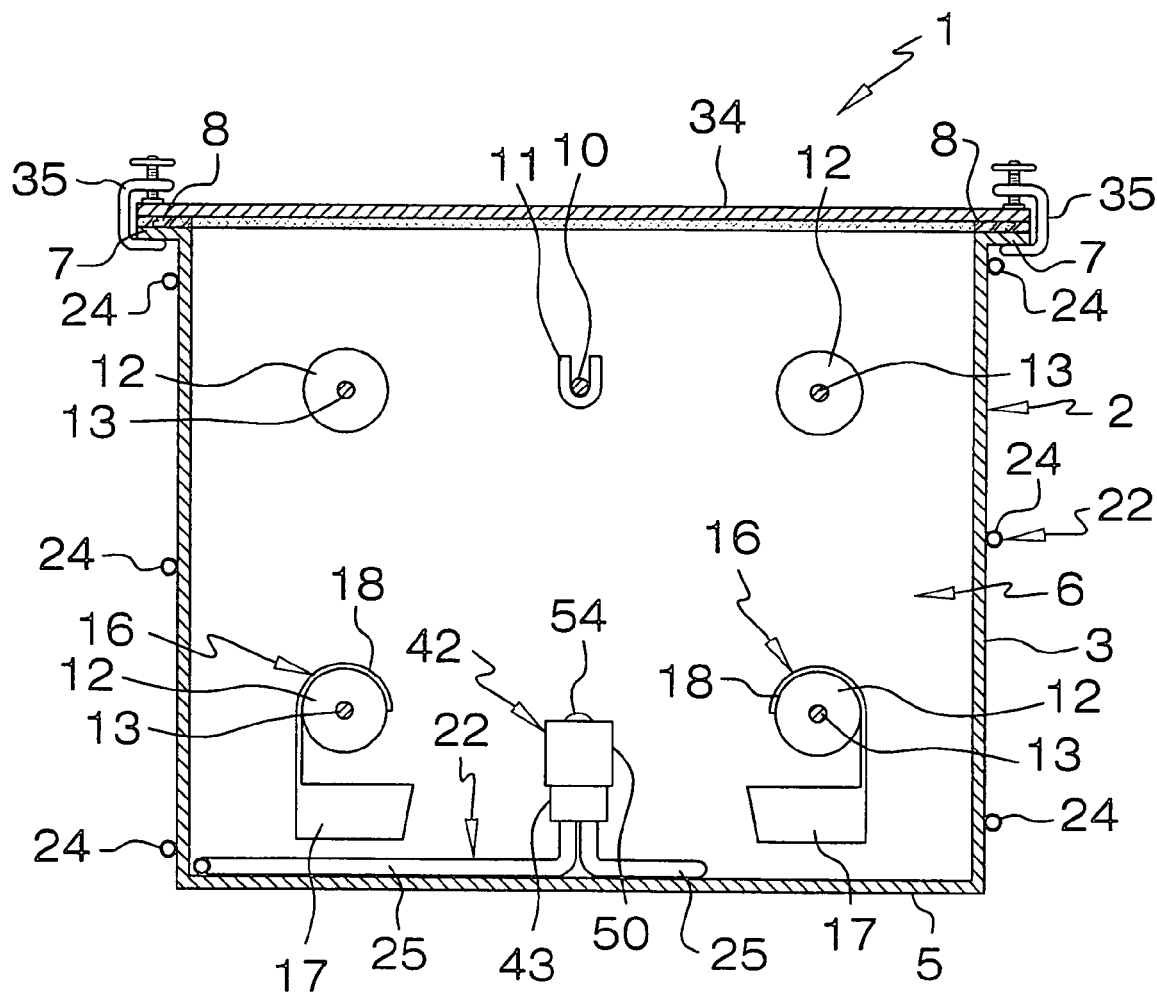
FIG. 4 is a cross-sectional view, taken along section lines 4-4 in FIG. 1.

Referring to the drawings, an illustrative embodiment of a smoking apparatus is generally indicated by reference numeral 1. The smoking apparatus 1 includes a base 2 which may have a generally elongated, rectangular configuration, as shown. Alternatively, the base 2 may have a circular or alternative configuration. The rectangular base 2 typically includes a pair of elongated side walls 3, a pair of end walls 4 connecting the side walls 3 and a bottom 5 provided on the side walls 3 and end walls 4. The base 2 has a base interior 6. A base flange 7 may extend outwardly from the upper edge of the side walls 3 and end walls 4, as shown in FIG. 4. A resilient sealing gasket 8 may be provided on the base flange 7.

A lid 34 is detachably mounted on the sealing gasket 8 of the base flange 7, typically using multiple lid clamps 35, for example. Alternatively, the lid 34 may be pivotally attached to the base 2, in which case the unattached portions of the lid 34 are held against the sealing gasket 8 using one or multiple clamps (not shown) of selected design.

Figure 2:
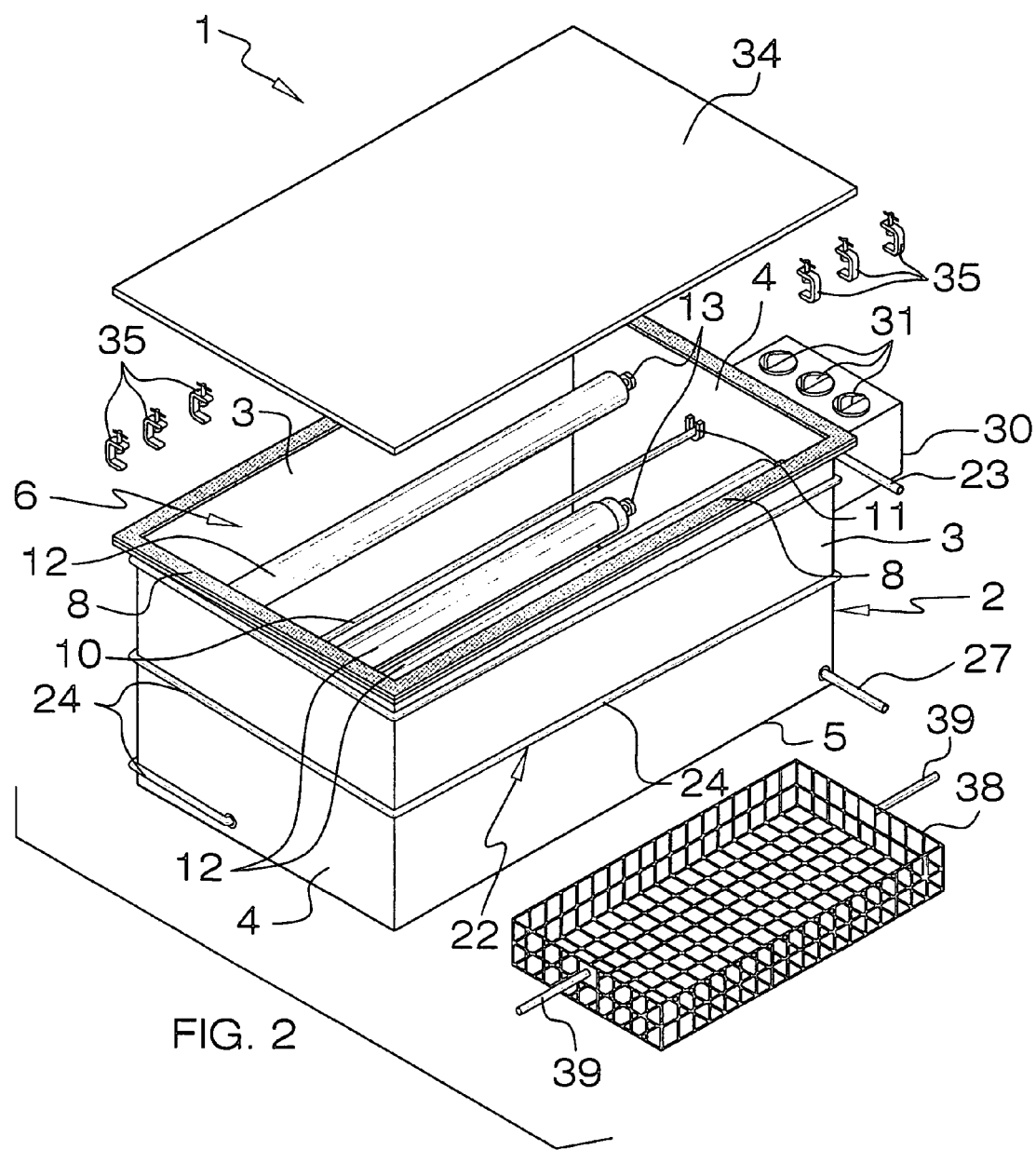
FIG. 2 is an exploded, perspective view of an illustrative embodiment of the smoking apparatus, illustrating a food basket removed from the smoking apparatus.
Figure 3:
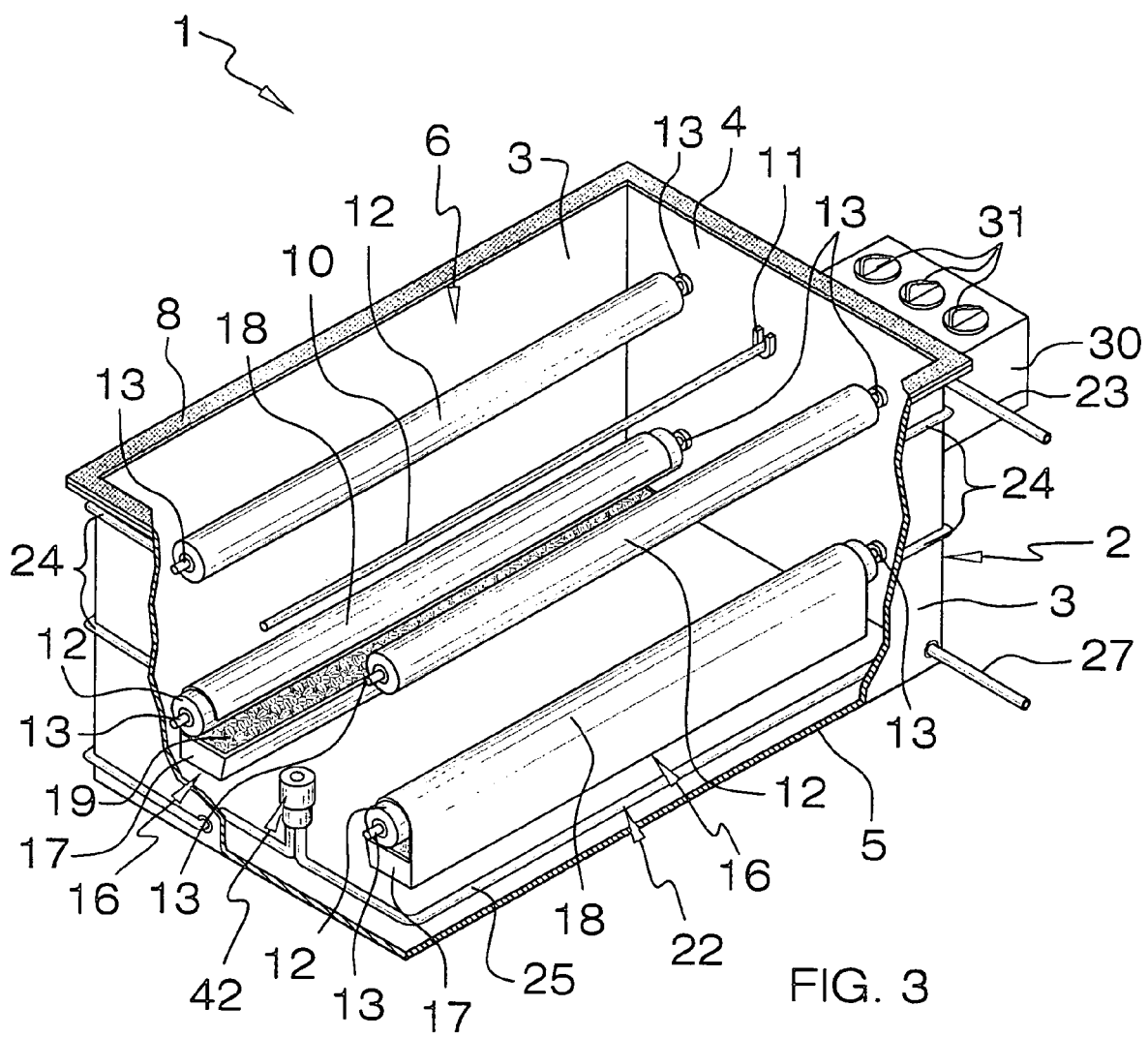
FIG. 3 is a perspective view, partially in section, of an illustrative embodiment of the smoking apparatus, illustrating typical interior components of the smoking apparatus.

As shown in FIGS. 2-4, a food rod 10, the purpose of which will be hereinafter described, may be provided in the base interior 6. The food rod 10 may be detachably mounted in the base interior 6. For example, a pair of rod supports 11 may be provided on the respective end walls 4, in generally aligned relationship to each other, in which case the respective ends of the food rod 10 rest in the respective rod supports 11. As shown in FIG. 2, a food basket 38 may be detachably fitted in the base interior 6 of the base 2. A pair of basket rods 39 may extend from opposite sides of the food basket 38 to seat in the respective rod supports 11 in the base interior 6.

At least one heating element 12 is provided in the base interior 6. Multiple heating elements 12 may be provided in the base interior 6, in spaced-apart relationship to each other. For example, an upper pair of heating elements 12 and a lower pair of heating elements 12 may be provided in the base interior 6. Each of the heating elements 12 may be supported in the base interior 6 by a pair of heating element rods 13 which extend from the respective end walls 4 of the base 2.

A trough 16 may be adapted to engage each of the heating elements 12, such as the lower pair of heating elements 12, for example. Each trough 16 may include, for example, a trough base 17 which is adapted to contain wood chips 19 or the like. A trough flange 18 extends from the trough base 17 and is adapted to engage the heating element 12 in such a manner that wood chips 19 contained in the trough base 17 are disposed in contact with or adjacent to the heating element 12, as shown in FIG. 3, in use of the smoking apparatus 1 as will be hereinafter described.

Figure 1:
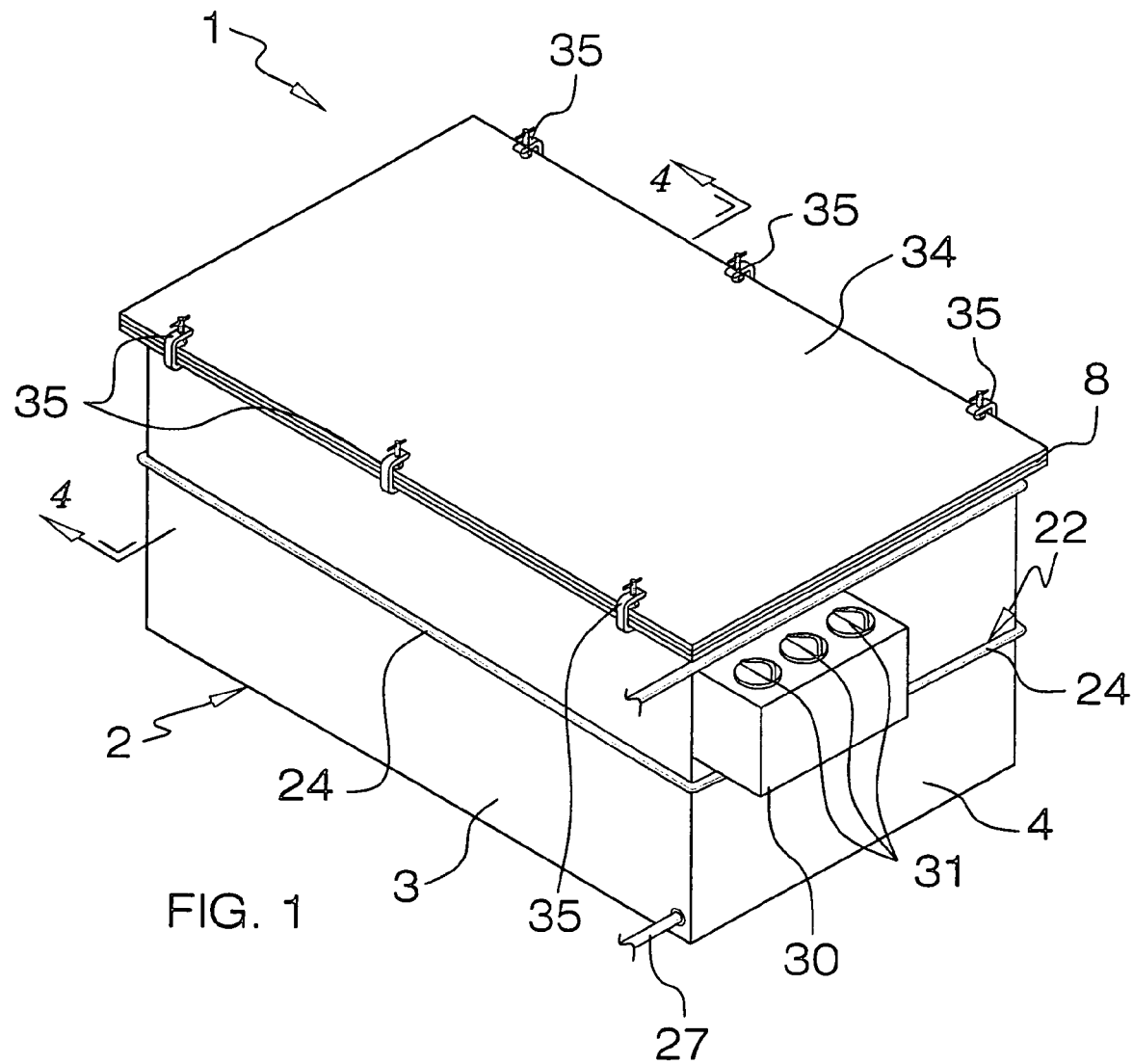
FIG. 1 is a perspective view of an illustrative embodiment of a smoking apparatus.
Figure 7:
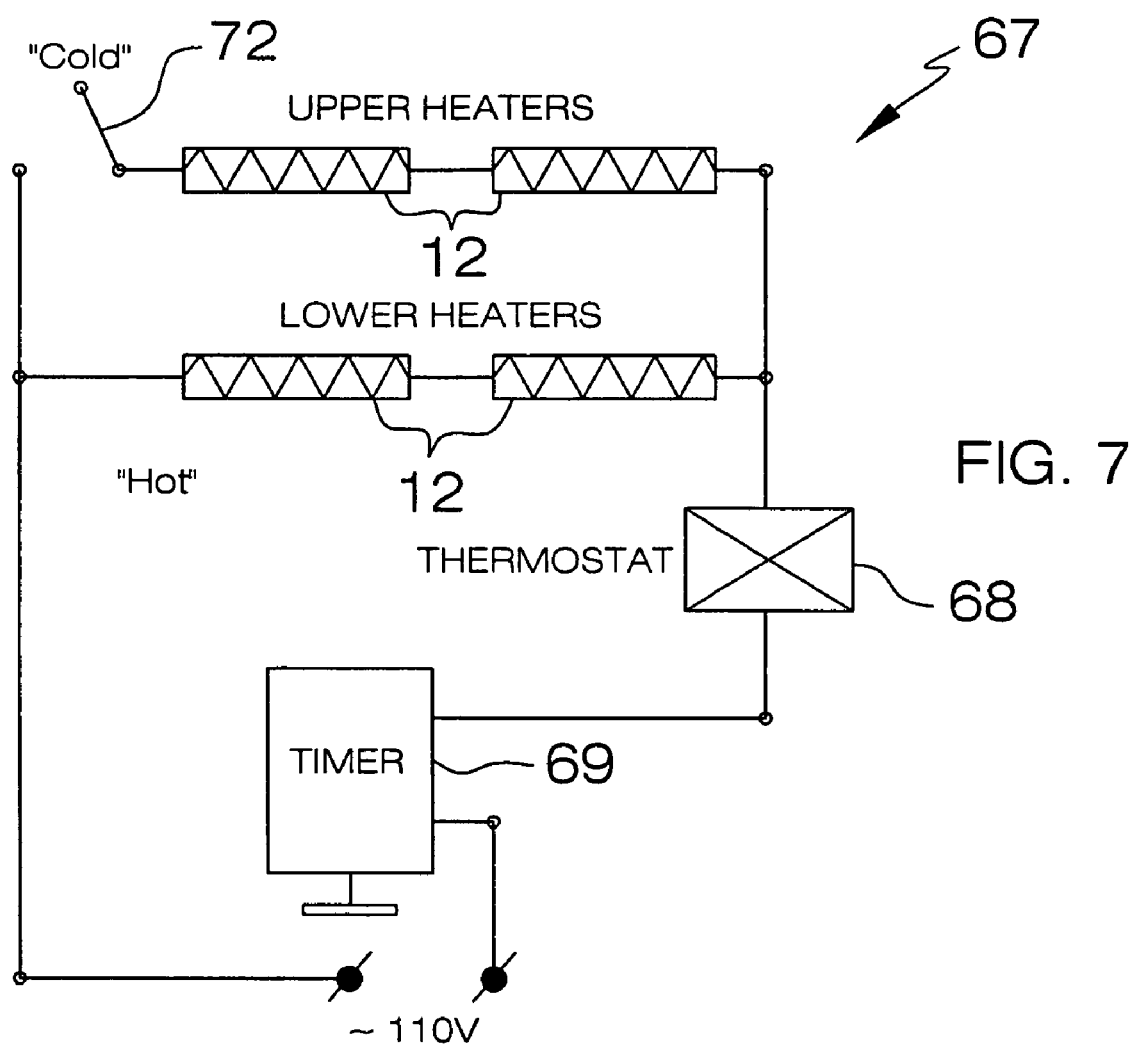
FIG. 7 is a schematic diagram illustrating an illustrative temperature control system of an illustrative embodiment of the smoking apparatus.

As shown in FIG. 7, a temperature control system 67 may be connected to the heating elements 12. The temperature control system 67 may include, for example, a thermostat 68 which is connected to the upper and lower heating elements 12 in the base 2; a timer 69 connected to the thermostat 68; and a switch 72 provided between the upper heating elements 12 and the timer 69. As shown in FIGS. 1-3, a control box 30 may be provided on the base 2 and includes multiple controls 31 for controlling the thermostat 68, the timer 69 and the switch 72 of the temperature control system 67. A selected temperature of the heating elements 12 during a smoking period may be set on the thermostat 68, which facilitates heating of the heating elements 12. A selected time for the smoking period may be set using the timer 69. The upper heating elements 12 may be selectively turned off during a smoking period, as desired to facilitate a lower temperature in the base 2, by opening the switch 72. Closing of the switch 72 facilitates operation of the upper heating elements 12 in addition to the lower heating elements 12.

Figure 6:
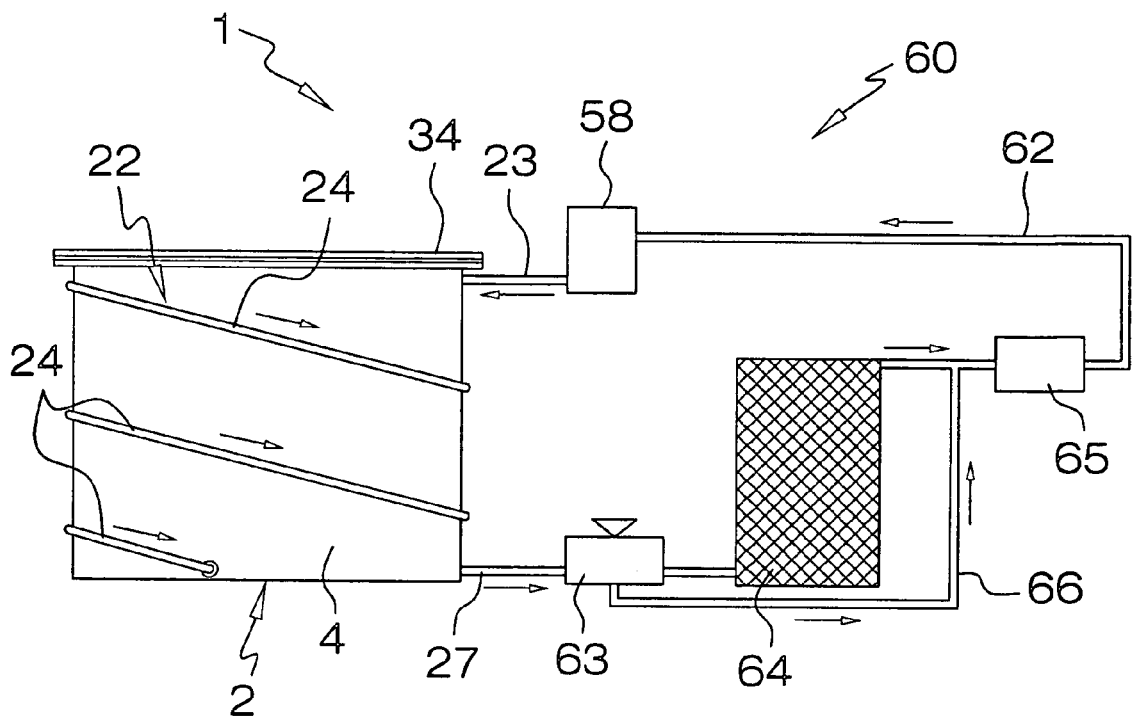
FIG. 6 is a schematic diagram illustrating an illustrative cooling system connected to an illustrative embodiment of the smoking apparatus.

As shown in FIG. 6, the smoking apparatus 1 may include a cooling system 60. The cooling system 60 may include, for example, a cooling coil 22 having an inlet segment 23; a coiled segment 24 which extends around the exterior of the base 2; an interior segment 25 (FIG. 4) which extends through the base interior 6; and an outlet segment 27 which extends from the base interior 6. As shown in FIG. 6, a flow control valve 63 is connected to the outlet segment 27 of the cooling coil 22; a radiator 64 is connected to the flow control valve 63; a water pump 65 is connected to the radiator 64; and an expansion container 58 may be connected to the water pump 65 and to the inlet segment 23 of the cooling coil 22. The flow control valve 63, radiator 64, water pump 65 and expansion container 58 may be provided in a common circulation loop 62 which is connected to the inlet segment 23 and the outlet segment 27 of the cooling coil 22. Controls 31 for the water pump 65 may be provided on the control box 30.

Figure 5:
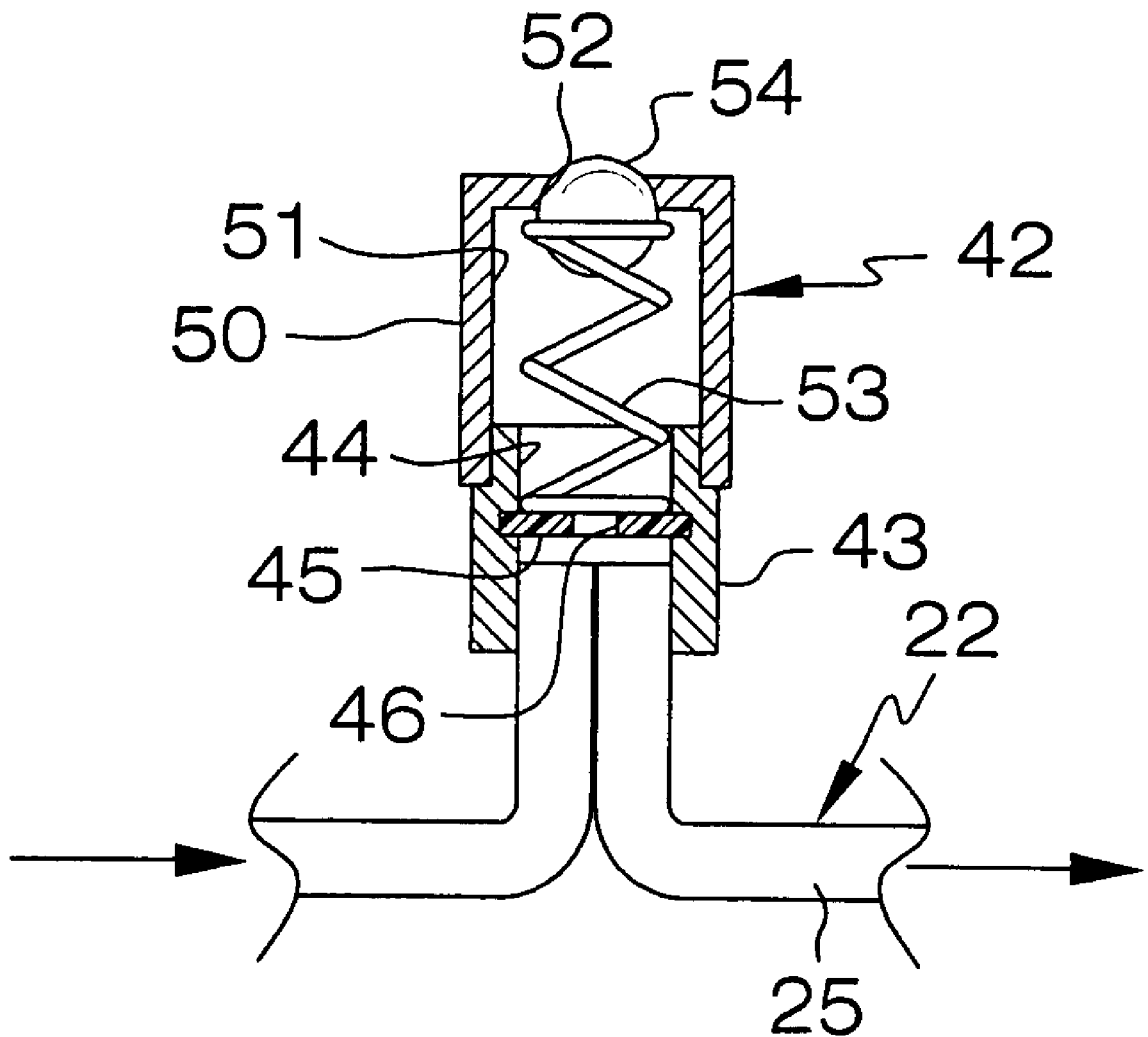
FIG. 5 is a sectional view of an illustrative pressure relief valve element of an illustrative embodiment of the smoking apparatus.

As shown in FIGS. 4 and 5, a pressure relief valve 42 may be provided in the interior segment 25 of the cooling coil 22 to relieve pressure in the base interior 6 through the cooling coil 22. The pressure relief valve 42 may include, for example, a valve base 43 having a base interior 44 which receives the interior segment 25 of the cooling coil 22. A spring seat 45, having a seat opening 46, is provided in the base interior 44. A valve housing 50 has a valve housing interior 51 which communicates with the base interior 44 of the valve base 43. A ball seat 52 is provided in the upper portion of the valve housing 50. A valve spring 53 is seated on the spring seat 45 and extends upwardly into the valve housing interior 51 of the valve housing 50. A valve ball 54 is normally biased against the ball seat 52 by the valve spring 53.

In the event that air pressure accumulates inside the base interior 6 during use of the smoking apparatus 1, the air pressure pushes against the valve ball 54 through the ball seat 52, against the bias exerted by the valve spring 53. When the air pressure exceeds a threshold value, the valve ball 54 is unseated from the ball seat 52, thus facilitating the flow of air from the base interior 6; through the ball seat 52, valve housing interior 51 and base interior 44, respectively; and into the cooling coil 22. The air pressure can be released from the cooling coil 22 through an appropriate pressure relief mechanism (not shown).

In typical use, various foods (not shown), such as meats and/or vegetables, for example, can be smoked in the base interior 6 of the base 2. Accordingly, wood chips 19 (FIG. 3) or the like can be placed in the trough base 17 of the trough 16 and the trough 16 attached to one or more of the heating elements 12. The food can be impaled on or otherwise supported in the base interior 6 by the food rod 10. Alternatively, the food can be placed in the food basket 38 (FIG. 2) and the basket rods 39 of the food basket 38 supported by the rod supports 11. The lid 34 is then placed on the sealing gasket 8 and secured typically using the lid clamps 35. The heating elements 12 are operated typically using the temperature control system 67 (FIG. 7), in which the thermostat 68 and timer 69 can be used to set the temperature of the heating elements 12 and the time, respectively, of the smoking period. The contact or close proximity of the heating element 12 to the wood chips 19 causes burning and smoking or smoldering of the wood chips 19, in such a manner that the smoke from the wood chips 19 fills the base interior 6.

The switch 72 (FIG. 7) of the temperature control system 67 can be selectively closed to operate all of the heating elements 12 or opened to operate only two of the heating elements 12. The cooling system 60 can be operated to cool the base 2 by distribution of water or other cooling liquid (not shown) through the circulation loop 62 and cooling coil 22 by operation of the water pump 65 in the direction indicated by the arrows in FIG. 6. The flow control valve 63 prevents backflow of water or cooling liquid through the outlet segment 27, whereas the radiator 64 facilitates the exchange of heat between air and the water or cooling liquid. The flow control valve 63 may also be adaptable to facilitate distribution of water or cooling liquid through a bypass line 66 which bypasses the radiator 64. Excessive air pressure in the base interior 6 is relieved through the pressure relief valve 42 and into the cooling coil 22. After smoking of the food in the base interior 6, the lid 34 is removed from the sealing gasket 8 and the food is removed from the food rod 10 or food basket 38.

While the preferred embodiments of the invention have been described above, it will be recognized and understood that various modifications can be made in the invention and the appended claims are intended to cover all such modifications which may fall within the spirit and scope of the invention.

What is claimed is:

1. A smoking apparatus, comprising:
   a base having a base interior;
   at least one heating element provided in said base interior;
   a trough carried by said at least one heating element;
   a lid provided on said base; and
   a cooling system thermally engaging said base.

2. The smoking apparatus of claim 1 wherein said trough comprises a trough flange carried by said at least one heating element and a trough base carried by said trough flange.

3. The smoking apparatus of claim 1 further comprising at least one food rod provided in said base interior.

4. The smoking apparatus of claim 3 further comprising a pair of rod supports provided in said base interior and wherein said at least one food rod is carried by said pair of rod supports.

5. The smoking apparatus of claim 1 further comprising a food basket provided in said base interior.

6. The smoking apparatus of claim 5 further comprising a pair of rod supports provided in said base interior and wherein said food basket is carried by said pair of rod supports.

7. A smoking apparatus, comprising:
   a base having a base interior;
   at least one heating element provided in said base interior;
   a trough carried by said at least one heating element;
   a cooling system having a cooling coil thermally engaging said base and a circulation loop connected to said cooling coil; and
   a lid provided on said base.

8. The smoking apparatus of claim 7 wherein said trough comprises a trough flange carried by said at least one heating element and a trough base carried by said trough flange.

9. The smoking apparatus of claim 7 further comprising at least one food rod provided in said base interior.

10. The smoking apparatus of claim 9 further comprising a pair of rod supports provided in said base interior and wherein said at least one food rod is carried by said pair of rod supports.

11. The smoking apparatus of claim 7 further comprising a food basket provided in said base interior.

12. The smoking apparatus of claim 11 further comprising a pair of rod supports provided in said base interior and wherein said food basket is carried by said pair of rod supports.

13. The smoking apparatus of claim 7 further comprising a radiator and a water pump provided in said circulation loop of said cooling system.

14. The smoking apparatus of claim 13 further comprising an expansion bottle provided in said circulation loop.

15. The smoking apparatus of claim 7 wherein said cooling coil comprises an inlet segment connected to said circulation loop, a coiled segment connected to said inlet segment and thermally engaging said base, an interior segment connected to said coiled segment and extending through said base interior and an outlet segment connected to said interior segment and said circulation loop.

16. The smoking apparatus of claim 15 further comprising a pressure relief valve provided in said interior segment of said cooling coil.

* * * * *